US012674010B2

(12) United States Patent
Wang et al.

(10) Patent No.: US 12,674,010 B2
(45) Date of Patent: Jul. 7, 2026

(54) POLYPROPYLENE-BASED ARTICLE HAVING AN INCREASED SURFACE TENSION RETENTION

(71) Applicant: Borealis AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Peter Niedersuess, Linz (AT); Stefan Ortner, Linz (AT)

(73) Assignee: Borealis AG, Vienna (AT)

( * ) Notice: Subject to any disclaimer, the term of this patent is extended or adjusted under 35 U.S.C. 154(b) by 651 days.

(21) Appl. No.: 18/023,402

(22) PCT Filed: Sep. 8, 2021

(86) PCT No.: PCT/EP2021/074642
§ 371 (c)(1),
(2) Date: Feb. 27, 2023

(87) PCT Pub. No.: WO2022/053475
PCT Pub. Date: Mar. 17, 2022

(65) Prior Publication Data

US 2023/0406971 A1 Dec. 21, 2023

(30) Foreign Application Priority Data

Sep. 11, 2020 (EP) .................................... 20195637

(51) Int. Cl.

| | |
|---|---|
| ***C08F 210/16*** | (2006.01) |
| ***C08F 4/659*** | (2006.01) |
| ***C08F 210/06*** | (2006.01) |
| ***C08J 5/18*** | (2006.01) |
| ***C08L 23/14*** | (2006.01) |

(52) U.S. Cl.
CPC ........ *C08F 210/06* (2013.01); *C08F 4/65916* (2013.01); *C08F 210/16* (2013.01); *C08J 5/18* (2013.01); *C08J 2323/16* (2013.01); *C08L 23/14* (2013.01)

(58) Field of Classification Search
CPC .............. C08F 210/16; C08F 2500/055; C08F 2500/26; C08F 2500/27; C08F 2500/30; C08F 2500/33; C08F 2500/34; C08F 2/001; C08F 2/34; C08L 23/14; C08J 5/18
See application file for complete search history.

(56) References Cited

U.S. PATENT DOCUMENTS

| | | | | |
|---|---|---|---|---|
| 10,385,196 | B2 * | 8/2019 | Defoer | C08L 23/12 |
| 11,680,118 | B2 * | 6/2023 | Wang | C08F 4/65927 525/240 |
| 2013/0035442 | A1 | 2/2013 | Tsou | |
| 2015/0025210 | A1 | 1/2015 | Canich et al. | |
| 2017/0066856 | A1 | 3/2017 | Massari et al. | |
| 2017/0342246 | A1 * | 11/2017 | Defoer | C08L 23/14 |

FOREIGN PATENT DOCUMENTS

| | | | | |
|---|---|---|---|---|
| CN | 111201274 | A | 5/2020 | |
| EP | 0887379 | B1 | 12/2004 | |
| EP | 2907841 | A1 | 8/2015 | |
| RU | 2276671 | C2 | 5/2006 | |
| WO | 9212182 | A1 | 7/1992 | |
| WO | 9414856 | A1 | 7/1994 | |
| WO | 9512622 | A1 | 5/1995 | |
| WO | 9924478 | A1 | 5/1999 | |
| WO | 9924479 | A1 | 5/1999 | |
| WO | 0068315 | A1 | 11/2000 | |
| WO | 200202576 | A1 | 1/2002 | |
| WO | 2004000899 | A1 | 12/2003 | |
| WO | 2004111095 | A1 | 12/2004 | |
| WO | 2006097497 | A1 | 9/2006 | |
| WO | 2007116034 | A1 | 10/2007 | |
| WO | 2008155404 | A1 | 12/2008 | |
| WO | 2011076780 | A1 | 6/2011 | |
| WO | 2011135004 | A2 | 11/2011 | |
| WO | 2012001052 | A2 | 1/2012 | |
| WO | 2012084961 | A1 | 6/2012 | |
| WO | 2013007650 | A1 | 1/2013 | |
| WO | 2014187686 | A1 | 11/2014 | |
| WO | 2015158790 | A2 | 10/2015 | |
| WO | 2016091925 | A1 | 6/2016 | |
| WO | 2017097579 | A1 | 6/2017 | |
| WO | 2018122134 | A1 | 7/2018 | |
| WO | 19002268 | A1 | 1/2019 | |
| WO | WO-2020002349 | A1 * | 1/2020 | C08L 23/14 |

OTHER PUBLICATIONS

Interntional Search Report and Written Opinion for Application No. PCT/EP2021/074642 mailed Jan. 18, 2022, 14 pages.
European Search Report for European Applicaton No. 20195637.2 dated Feb. 26, 2021, 8 pages.
Resconi, et al., "Selectivity in Propene Polymerization with Metallocene Catalysts," Chem. Rev., 2000, vol. 100, pp. 1253-1345.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Cheng, H.N., "C NMR Analysis of Ethylene-Propylene Rubbers," Macromolecules, 1984, vol. 17, 1984, pp. 1950-1955.
Randall, et al., "A Review of High Resolution Liquid 13Carbon Nuclear Magnet Resonance Characterizations of Ethylene-Based Polymers", Rev. Macromol. Chem. Phys. 1989, C29, 201-317.
Zhou, et al., "A new decoupling method for accurate quantification of polyethylene copolymer composition and triad sequence distribution with 13C NMR," Journal of Magnetic Resonance, vol. 187, 2007, pp. 225-233.

(Continued)

*Primary Examiner* — Rip A Lee
(74) *Attorney, Agent, or Firm* — Lowenstein Sandler LLP

(57) ABSTRACT

Process for the production of a polypropylene based article having improved surface tension retention, and polypropylene based article having improved surface tension.

20 Claims, No Drawings

(56) References Cited

OTHER PUBLICATIONS

Singh, et al., "Triad Sequence Determination of Ethylene-Propylene Copolymers—Application of Quantitative 13C NMR," Polymer Testing, 2009, vol. 29, pp. 475-479.
Wang, et al., "Structural Analysis of Ethylene/Propylene Copolymers Synthesized with a Constrained Geometry Catalyst," Macromolecules, 2000, vol. 33, pp. 1157-1162.
Office Action for Chinese Patent Application No. 202180052551.0 with English translation, dated Oct. 20, 2023, 19 pages.
Office Action for Russian Patent Application No. 2023107225/04 with English translation, dated Sep. 29, 2023, 28 pages.
Office Action for Indian Patent Application No. 202317012738 with English translation, dated Nov. 29, 2023, 5 pages.
Office Action for Russian Application No. 2023107225/04 with English Translation dated Dec. 22, 2023, 17 pages.
Tsvetkova V.I., Metallocene catalysis in polymerization processes of alpha-olefins, High molecular weight compounds, Series C, 2000], vol. 42, issue 11, p. 1954-1973 Machine Translation.
Selikhova V.I. et al. The Effect of Stereoregularity on the Structure and Thermophysical Properties of Isotactic Polypropylene, Journal: High Molecular Weight Compounds, Series A, vol. 50, 10, 2008], p. 1810-1822 Machine Translation.
Chukanova O.M., et al. Effective polymer-immobilized metallocene catalysts for synthesis of stereoregular polypropylene. Journal: High Molecular Weight Compounds, Series A, vol. 45, 8, 2003], p. 1268-1273 Machine Translation.

* cited by examiner

POLYPROPYLENE-BASED ARTICLE HAVING AN INCREASED SURFACE TENSION RETENTION

CROSS-REFERENCE TO RELATED APPLICATION(S)

The present application is a national stage entry under 35 U.S.C. § 371 of International Application No. PCT/EP2021/074642, filed on Sep. 8, 2021, which claims priority to European Patent Application No. 20195637.2, filed on Sep. 11, 2020. The contents of these applications are hereby incorporated by reference in their entirety.

FIELD OF THE INVENTION

The present invention is related to a process for the production of a polypropylene based article having improved surface tension retention, and to the polypropylene based article having improved surface tension.

BACKGROUND

Articles like films made out of polypropylene random copolymers are very common within the polymer industry and are used in applications that require superior optical properties such as gloss, transparency, surface smoothness, planarity and good tear resistance. Films made via blown film or cast film extrusion are widely used for numerous applications, e.g. in food and textiles packaging, flower wrapping, as photo album page protectors, as coating substrates in extrusion coating processes or laminated to other materials in the formation of more complex films.

Such films are known for their good transparency, clarity or gloss and easy processability. They can be produced on high-speed extrusion lines, even with low thicknesses.

While the mechanical, chemical and processing properties make polypropylene the material of choice in a wide range of applications, its chemical inertness and low surface energy pose problems in applications requiring printing, coating, bonding or adhesion to other more polar substrates. For these applications, it is therefore necessary to subject the polypropylene to a surface-modifying treatment that increases the surface energy.

The surface energy of a polymer is important for wetting and/or contacting a final article with inks, glue or coatings. The higher the surface energy the better the wetting will be. Ideally, the surface energy of the polymer is higher than the surface tension of e.g. the ink used for printing or the glue used for lamination to get a good bonding between the ink, coating or glue with the respective surface.

In printing applications, the surface energy needs to be increased from around 30 dyne/cm of untreated polymer articles to around 38 dyne/cm to be printable with solvent-based inks and to around 45 dyne/cm for being printable with water-based inks.

Increasing the surface energy of polypropylene is especially difficult as the energy required to increase the surface energy is much higher than for other polymers. Suitable methods to increase the surface energy of polypropylene include chemical treatment, flame-treatment, and Corona-treatment. In flame-treatment the polypropylene surface is treated with an oxidizing gas flame. In Corona-treatment the polypropylene surface is treated with air that has been electrically ionized. All methods have in common that oxidized centers are generated, which facilitate the adhesion of inks etc.

Over time, the obtained dyne-level will decrease. Subsequently the treated polypropylene may require a “refresher” treatment before further transformation. This requires an additional handling step and additional effort for the packaging industry.

Hence it is a permanent need of the packaging industry, that the surface energy, respectively tension, after surface treatment is on a high level and remains on an elevated level as long as possible, to provide more flexibility within the production and printing processes to achieve satisfying printing quality.

Several proposals regarding this topic have already been made.

For Example, WO 2008155404 A1 deals with polypropylene with improved response to surface energy increasing treatments and proposes metallocene-catalysed polyethylene to be used as additive.

The density of the metallocene-catalysed polyethylene is at least 920 kg/cm$^3$ or higher. The application however does not contain any examples to show the alleged effect, and the additive will necessarily result in worse transparency.

WO 2016091925 A1 proposes to use a blend a propylene random copolymer with an ethylene based plastomer having a density of less than 915 kg/cm$^3$ for the production of a corona-treated polyolefin film, whereby the propylene random copolymers used are polymers produced in the presence of a Ziegler-Natta catalyst. Also here, film transparency is reduced.

WO 2017097579 A1 describes the use of a combination of propylene-1-hexene copolymers and a propylene-ethylene copolymer to achieve good dyne retention. Both types of copolymer are produced with stereospecific Ziegler-Natta catalysts supported on magnesium dihalides.

The general drawback of these proposals is that apart from polypropylene an additional polymeric component in the form of the metallocene-catalysed polyethylene or the second propylene copolymer is required.

Although a lot of development work has been done in that field, there is still a need for further improvement and thus for designing materials which lead to an improved surface tension directly after surface treatment, which furthermore remains on an elevated level as long as possible.

The present invention is based on the finding that the above discussed needs can be achieved by a specific design of a metallocene catalysed polypropylene random copolymer.

SUMMARY OF THE INVENTION

Thus, the present invention is related to a process for the production of a polypropylene based article having improved surface tension retention, said process comprises the steps of A) providing a metallocene-catalysed propylene-ethylene random copolymer (RACO) having
(a) an ethylene content in the range of from 1.0 to 10.0 wt.-% based on the total weight of the propylene-ethylene random copolymer;
(b) a melt flow rate $MFR_2$ (230° C./2.16 kg) measured according to ISO 1133 in the range of from 1.0 to 20.0 g/10 min;
(c) a melting temperature Tm as determined by DSC according to ISO 11357 of from 115 to 150° C.;
(d) a xylene cold soluble (XCS; ISO 16152, 2005; 25° C.) fraction of from 0.1 wt.-% to 5.0 wt.-% and
(e) a content of 2,1 regio-defects in the range from 0.05 to 1.5 mol % as determined by $^{13}$C-NMR spectroscopy;

B) forming an article out of the metallocene-catalysed propylene-ethylene random copolymer (RACO) with a thickness in the range of from 1.0 to 1000 μm and C) subjecting one or more surface(s) of said article to a treatment that increases the surface tension to yield a polypropylene based article having improved surface tension retention, wherein the metallocene-catalysed propylene-ethylene random copolymer (RACO) is the sole polymer used for forming the article.

It has surprisingly been found, that by using the specific metallocene-catalysed propylene-ethylene random copolymer (RACO) articles having improved surface tension retention can be produced without the need of a further polymeric component.

Such articles furthermore have a higher surface tension directly after surface treatment and an improved surface tension retention compared to articles made from Ziegler-Natta catalysed polypropylene polymers.

DETAILED DESCRIPTION

The process for the production of a polypropylene based article having improved surface tension retention according to the present invention comprises as a first step A) providing a metallocene-catalysed propylene-ethylene random copolymer (RACO) having (a) an ethylene content in the range of from 1.0 to 10.0 wt.-% based on the total weight of the propylene-ethylene random copolymer;

(b) a melt flow rate $MFR_2$ (230° C./2.16 kg) measured according to ISO 1133 in the range of from 1.0 to 20.0 g/10 min;

(c) a melting temperature Tm as determined by DSC according to ISO 11357 in the range of from 115 to 150° C.;

(d) a xylene cold soluble (XCS; ISO 16152, 2005; 25° C.) fraction of from 0.1 wt.-% to 5.0 wt.-% and (e) a content of 2,1 regio-defects in the range from 0.05 to 1.5 mol % as determined by $^{13}C$-NMR spectroscopy.

The propylene-ethylene random copolymer (RACO) used according to the invention is a random copolymer of propylene and ethylene as comonomer.

The propylene-ethylene random copolymer (RACO) is obtained in the presence of a metallocene catalyst.

Thus, the term metallocene catalysed propylene-ethylene random copolymer means that the polymer is produced in the presence of a metallocene catalyst.

The propylene-ethylene random copolymer (RACO) used according to this invention is featured by a moderate to low ethylene comonomer content.

Accordingly, the propylene-ethylene random copolymer (RACO) has an ethylene content in the range of from 1.0 to 10.0 wt.-%, preferably in the range of from 1.5 to 6.0 wt.-%, more preferably in the range of from 1.8 to 4.0 wt.-%, and still more preferably in the range of from 2.0 to 3.5 wt.-% based on the total weight of the propylene-ethylene random copolymer (RACO).

The propylene-ethylene random copolymer (RACO) has a melt flow rate $MFR_2$ (230° C.) measured according to ISO 1133 in the range of from 1.0 to 20.0 g/10 min, preferably in the range of from 2.0 to 15.0 g/10 min, more preferably in the range of from 3.0 to 12.0 g/10 min and still more preferably in range of from 5.0 to 10.0 g/10 min.

Additionally, the propylene-ethylene random copolymer (RACO) is defined by the xylene cold soluble (XCS) content determined at 25° C. according ISO 16152; 2005. Accordingly, the propylene-ethylene random copolymer (RACO) is featured by a xylene cold soluble (XCS) content of from 0.1 wt.-% to 5.0 wt.-%.

Preferably, the propylene-ethylene random copolymer (RACO) has a xylene cold soluble (XCS) content in the range of from 0.5 to 4.0 wt.-% and most preferably in the range of 0.8 to 3.0 wt.-%.

The propylene-ethylene random copolymer (RACO) is further defined by the melting temperature (Tm) measured via DSC according to ISO 11357. Accordingly, the propylene-ethylene random copolymer (A) has a melting temperature Tm in the range of from 115 to 150° C., preferably in the range of from 120° C. to 145° C., and more preferably in the range of from 125° C. to 143° C., like in the range of from 130° C. to 141° C.

Furthermore, the propylene-ethylene random copolymer (RACO) is defined by its content of 2,1 regio-defects in the range from 0.05 to 1.5 mol % as determined by $^{13}C$-NMR spectroscopy. Preferably the content of 2,1 regio-defects is in the range from 0.10 to 1.2 mol %, like in the range of 0.15 to 1.0 mol %.

The term 2,1 regio-defects used according to the present invention is the sum of detected isolated 2,1e region-defects [21e] and 2,1 regio defect adjacent ethylene [E21], as also described in the Experimental part of the invention.

In particular, polypropylenes prepared by using a metallocene catalyst provide a different microstructure compared to polypropylenes prepared by using Ziegler-Natta (ZN) catalysts. The most significant difference is the presence of regio-defects in metallocene-made polypropylenes. These regio-defects can be of different types, namely 2,1 regio-defects, including 2,1-erythro [21e], 2,1 regio defect adjacent ethylene [E21], 2,1-threo and 3,1 defects. A detailed description of the structure and mechanism of formation of regio-defects in polypropylene can be found in Chemical Reviews 2000,100 (4), pages 1316-1327. By introducing defects into the polymer chain, such as comonomers, stereo-errors or regio-defects, the physical properties of polypropylene can be modified. In particular, by increasing the amount of chain defects, crystallinity and melting point of polypropylene can be reduced.

In order to facilitate processing, especially film processing, it is also desirable that the propylene-ethylene random copolymer (RACO) used according to the present invention has a suitable crystallization temperature even in absence of any nucleating agents. Preferably, the propylene-ethylene random copolymer (RACO) therefore has a crystallization temperature Tc as determined by DSC (differential scanning calorimetry) according to ISO 11357 in the range of 85° C. to 120° C., more preferably in the range of 90° C. to 115° C., like in the range of 95° C. to 113° C.

The propylene-ethylene random copolymer (RACO) preferably also has a flexural modulus as determined according to ISO 178 on injection moulded specimens of 600 to below 1500 MPa, preferably in the range of 700 to 1400 MPa.

Thus, in a further embodiment the propylene-ethylene random copolymer (RACO) used according to the present invention has (a) an ethylene content in the range of from 1.0 to 10.0 wt.-%;

(b) a melt flow rate $MFR_2$ (230° C./2.16 kg) measured according to ISO 1133 in the range of from 1.0 to 20.0 g/10 min;

(c) a melting temperature Tm as determined by DSC according to ISO 11357 of from 115° C. to 150° C.;

(d) a xylene cold soluble (XCS) fraction of from 0.1 wt.-% to below 5.0 wt.-%, (e) a content of 2,1 regio-defects in the range from 0.05 to 1.5 mol % as determined by 13C-NMR spectroscopy and (f) a crystallization temperature Tc as determined by DSC (differential scanning calorimetry) according to ISO 11357 in the range of 85° C. to 120° C., preferably 90° C. to 115° C. and/or (g) a flexural modulus as determined according to ISO 178 on injection moulded specimens of 600 to below 1500 MPa, preferably in the range of 700 to 1400 MPa.

The propylene-ethylene random copolymer (RACO) can be unimodal or multimodal, like bimodal in view of the comonomer content and/or $MFR_2$ and can comprise, preferably consist of polymer fractions (RACO-1) and (RACO-2).

Thus, according to another embodiment the propylene-ethylene random copolymer (RACO) comprises to 70.0 wt.-% of polymer fraction (RACO-1) having (i) an ethylene content in the range of from 1.5 to 5.5 wt.-% and (ii) a melt flow rate $MFR_2$ (230° C./2.16 kg) measured according to ISO 1133 in the range of from 2.0 to 15.0 g/10 min and 70.0 to 30.0 wt.-% of polymer fraction (RACO-2) having (i) an ethylene content in the range of from 2.2 to 8.0 wt.-% and (ii) a melt flow rate $MFR_2$ (230° C./2.16 kg) measured according to ISO 1133 in the range of from 4.0 to 12.0 g/10 min.

More preferably, the propylene-ethylene random copolymer (RACO) comprises 40.0 to 70.0 wt.-% of polymer fraction (RACO-1) and 30.0 to 60.0 wt.-% of polymer fraction (RACO-2).

Even more preferably, the propylene-ethylene random copolymer (RACO) comprises 45.0 to wt.-% of polymer fraction (RACO-1) and 35.0 to 55.0 wt.-% of polymer fraction (RACO-2).

In case of an unimodal propylene-ethylene random copolymer (RACO), the copolymer can be produced in a one-stage polymerization process, whereby the copolymer consists of only one fraction or the copolymer can be produced in an at least two stage polymerization process, whereby the polymerization conditions are chosen in a way that the fractions produced in the different reactors, e.g. (RACO-1) and (RACO-2), have the same properties, like comonomer content and $MFR_2$.

In case of a multimodal, like bimodal propylene-ethylene random copolymer (RACO), the copolymer is produced in an at least two stage polymerization process, whereby the polymerization conditions are chosen in a way that the fractions produced in the different reactors, e.g. (RACO-1) and (RACO-2), have at least one differentiating property, like comonomer content and/or MFR2.

The propylene-ethylene random copolymer (RACO) is thus either prepared in one reactor or is preferably prepared by polymerizing propylene and ethylene by a sequential polymerization process comprising at least two reactors connected in series in the presence of a metallocene catalyst.

Therefore, the propylene-ethylene random copolymer (RACO) is preferably prepared in a sequential polymerization process comprising at least two polymerization reactors (R1) and (R2), whereby in the first polymerization reactor (R1) a first polymer fraction (RACO-1) is produced, which is subsequently transferred into the second polymerization reactor (R2). In the second polymerization reactor (R2), a second polymer fraction (RACO-2) is then produced in the presence of the first polymer fraction (RACO-1).

Polymerization processes which are suitable for producing the propylene-ethylene random copolymer (RACO) generally comprise at least two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the propylene-ethylene random copolymer (RACO) is produced in at least two reactors, preferably two reactors, connected in series. Accordingly, such a polymerization system comprises at least a first polymerization reactor (R1) and a second polymerization reactor (R2), and optionally a third polymerization reactor (R3). Preferably, such a polymerization system comprises at least a first polymerization reactor (R1) and a second polymerization reactor (R2).

The first polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention, the slurry reactor is preferably a (bulk) loop reactor. The second polymerization reactor (R2) and the optional third polymerization reactor (R3) are preferably gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basel!.

Preferably, in the instant process for producing the propylene-ethylene random copolymer (RACO) as defined above the conditions for the first reactor (R1), i.e. the slurry reactor (SR), like a loop reactor (LR), of step (a) may be as follows:

the temperature is within the range of 40° C. to 110° C., preferably between 60° C. and 100° C., more preferably between 65 and 95° C., the pressure is within the range of 20 bar to 80 bar, preferably between 40 bar to 70 bar, hydrogen can be added for controlling the molar mass in a manner known per se.

Subsequently, the reaction mixture of the first reactor (R1) is transferred to the second reactor (R2), i.e. gas phase reactor (GPR1), where the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The propylene-ethylene random copolymer (RACO) used according to this invention is produced in the presence of a metallocene catalyst.

Thus, the propylene-ethylene random copolymer (RACO) is preferably produced by a process comprising the following steps:

a) polymerizing in a first reactor (R1) propylene and ethylene, obtaining polymer fraction (RACO-1) of the propylene-ethylene random copolymer (RACO), b) transferring said polymer fraction (RACO-1) and unreacted comonomers of the first reactor in a second reactor (R2), c) feeding to said second reactor (R2) propylene and ethylene, d) polymerizing in said second reactor (R2) and in the presence of said polymer fraction (RACO-1) propylene and ethylene obtaining polymer fraction (RACO-2)

said polymer fraction (RACO-1) and said polymer fraction (RACO-2) forming the propylene-ethylene random copolymer (RACO) as defined above, whereby the polymerization takes place in the presence of a metallocene catalyst comprising (a) a complex of formula (I):

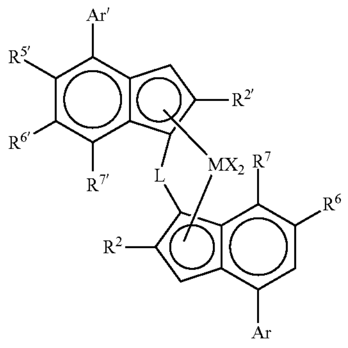

wherein

M is zirconium or hafnium;

each X is a sigma ligand;

L is a divalent bridge selected from —$R'_2C$—, —$R'_2C$—$CR'_2$—, —$R'_2Si$—, —$R'_2Si$—$SiR'_2$—, —$R'_2Ge$—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$ hydrocarbyl radical optionally containing one or more heteroatoms from groups 14-16;

$R^{5'}$ is a $C_{1-20}$ hydrocarbyl group containing one or more heteroatoms from groups 14-16 optionally substituted by one or more halo atoms;

$R^6$ and $R^{6'}$ are each independently hydrogen or a $C_{1-20}$ hydrocarbyl group optionally containing one or more heteroatoms from groups 14-16; wherein $R^{6'}$ is preferably a tertiary alkyl group $R^7$ is hydrogen or $C_{1-20}$ hydrocarbyl group optionally containing one or more heteroatoms from groups 14-16;

$R^{7'}$ is hydrogen;

Ar and Ar' are each independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar or Ar' group, said ring being itself optionally substituted with one or more groups $R^4$;

each $R^4$ is a $C_{1-20}$ hydrocarbyl group; and (ii) a cocatalyst comprising at least one or two compounds of a group 13 metal, e.g. Al and/or boron compound.

More preferably, a cocatalyst system comprising a boron containing cocatalyst, like a borate and an aluminoxane cocatalyst is used.

Even more preferably, the catalyst is supported on a silica support.

Ad Catalyst

The catalyst used in the process of the invention is in solid particulate form. It can be supported on a conventional carrier, like silica, know to an art skilled person. Preferred complexes of use in the invention are of formula (II') or (II)

(II')

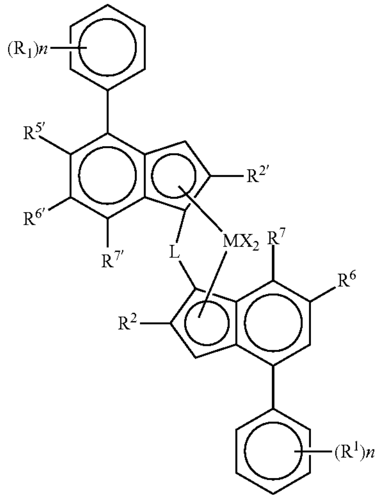

(II)

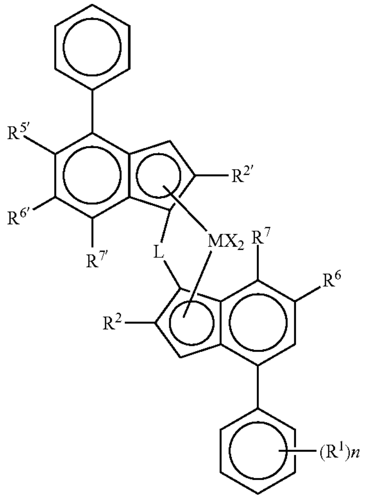

wherein

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$ alkyl, $C_{3-10}$ cycloalkyl, tri($C_{1-20}$-alkyl)silyl, $C_{6-20}$-aryl, $C_{7-20}$arylalkyl or C7$_{-20}$ alkylaryl;

each $R^2$ or $R^{2'}$ is a $C_{1-10}$alkyl group;

$R^{5'}$ is a $C_{1-10}$alkyl group or Z'$R^{3'}$ group;

$R^6$ is hydrogen or a $C_{1-10}$alkyl group;

$R^{6'}$ is a $C_{1-10}$alkyl group or $C_{6-10}$ aryl group; preferably a tertiary alkyl group;

$R^7$ is hydrogen, a $C_{1-6}$ alkyl group or Z$R^3$ group;

$R^{7'}$ is hydrogen;

Z and Z' are independently O or S;

$R^{3'}$ is a $C_{1-10}$alkyl group, or a $C_{6-10}$ aryl group optionally substituted by one or more halo groups;

$R^3$ is a $C_{1-10}$-alkyl group;

each n is independently 0 to 4, e.g. 0, 1 or 2;

and each $R^1$ is independently a $C_{1-20}$ hydrocarbyl group, e.g. $C_{1-10}$alkyl group.

Further preferred complexes of use in the invention are of formula (III') or (III):

(III')

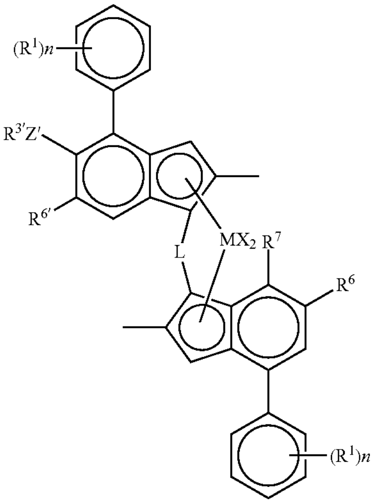

(III)

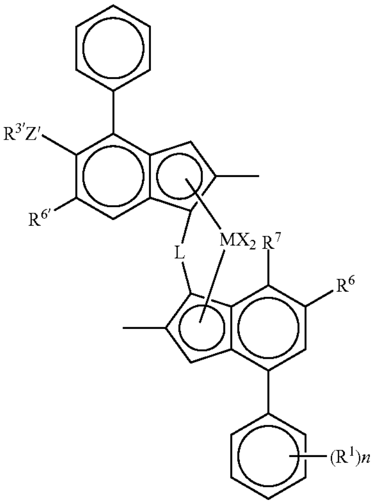

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C— or —R'$_2$Si— wherein each R' is independently a hydrogen atom, $C_{1-20}$ alkyl or $C_{3-10}$ cycloalkyl;

$R^6$ is hydrogen or a $C_{1-10}$alkyl group;

$R^{6'}$ is a $C_{1-10}$alkyl group or $C_{6-10}$ aryl group, preferably a tertiary alkyl group;

$R^7$ is hydrogen, $C_{1-6}$ alkyl or O$C_{1-6}$ alkyl;

Z' is O or S;

$R^{3'}$ is a $C_{1-10}$ alkyl group, or $C_{6-10}$ aryl group optionally substituted by one or more halo groups;

n is independently 0 to 4, e.g. 0, 1 or 2; and each $R^1$ is independently a $C_{1-10}$ alkyl group.

Further preferred complexes of use in the invention are of formula (IV') or (IV):

(IV')

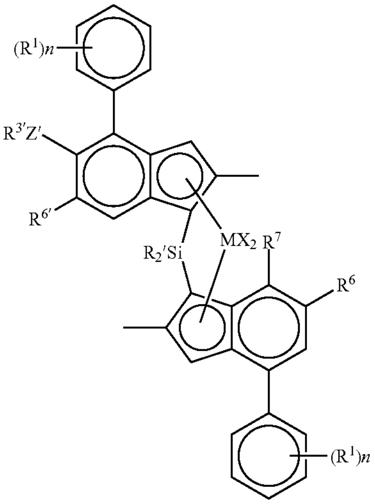

(IV)

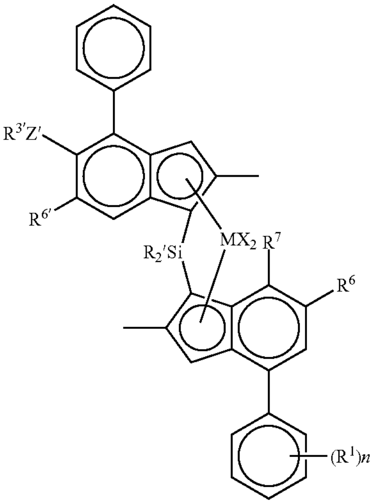

M is zirconium or hafnium;

each X is a sigma ligand, preferably each X is independently a hydrogen atom, a halogen atom, $C_{1-6}$-alkoxy group, $C_{1-6}$-alkyl, phenyl or benzyl group;

each R' is independently a hydrogen atom, $C_{1-20}$ alkyl or $C_{3-7}$ cycloalkyl;

$R^6$ is hydrogen or a $C_{1-10}$ alkyl group;

$R^{6'}$ is a $C_{1-10}$ alkyl group or $C_{6-10}$ aryl group, preferably a tertiary alkyl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0, 1 to 2; and each $R^1$ is independently a $C_{3-8}$ alkyl group.

Most preferably, the complex of use in the invention is of formula (V') or (V):

(V')

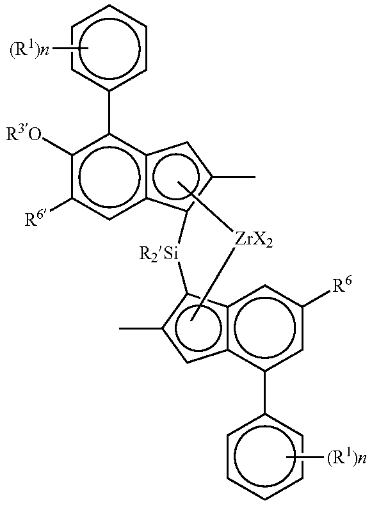

(V)

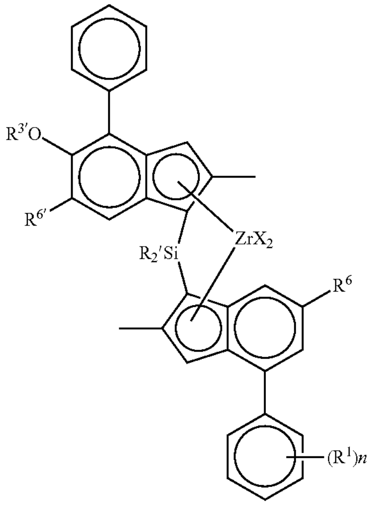

wherein each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{3-8}$ alkyl;

$R^6$ is hydrogen or a $C_{3-8}$ alkyl group;

$R^{6'}$ is a $C_{3-8}$ alkyl group or $C_{6-10}$ aryl group, preferably a tertiary $C_{4-8}$ alkyl group;

$R^{3'}$ is a $C_{1-6}$ alkyl group, or $C_{6-10}$ aryl group optionally substituted by one or more halo groups; and n is independently 0, 1 or 2.

Particular compounds of the invention include:

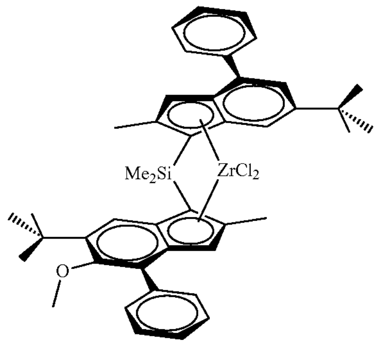

rac-anti-$Me_2Si$(2-Me-4-Ph-6-tBu-Ind)(2-Me-4-Ph-5-OMe-6-tBu-Ind)$ZrCl_2$

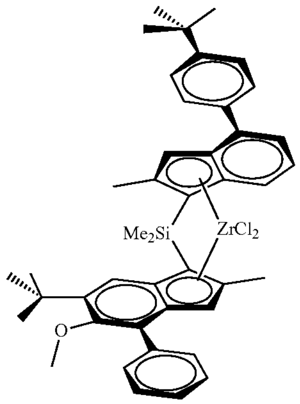

rac-anti-$Me_2Si$(2-Me-4-(p-tBuPh)-Ind)(2-Me-4-Ph-5-OMe-6-tBu-Ind)$ZrCl_2$

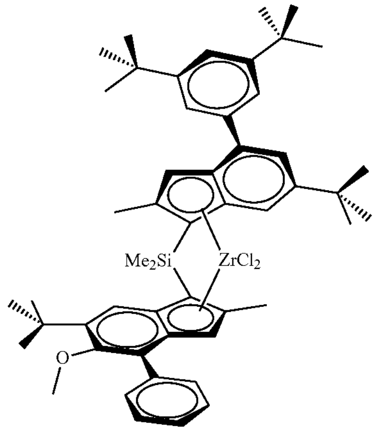

rac-anti-$Me_2Si$(2-Me-4-(3,5-di-tBuPh)-6-tBu-Ind)(2-Me-4-Ph-5-OMe-6-tBu-Ind)$ZrCl_2$

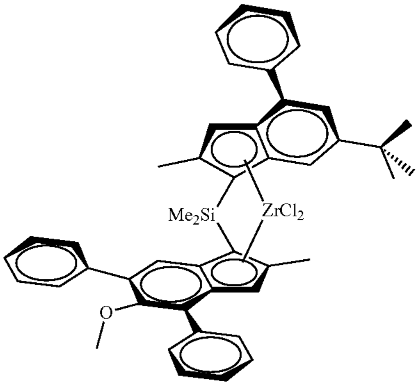
rac-anti-$Me_2Si$(2-Me-4-Ph-6-tBu-Ind)(2-Me-4,6-di-Ph-5-OMe-Ind)$ZrCl_2$
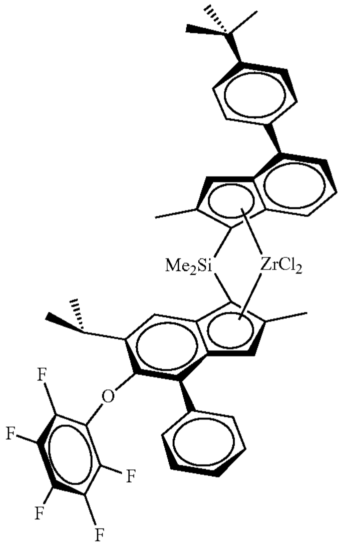
rac-anti-$Me_2Si$(2-Me-4-(p-tBuPh)-Ind)(2-Me-4-Ph-5-$OC_6F_5$)-6-iPr-Ind)$ZrCl_2$
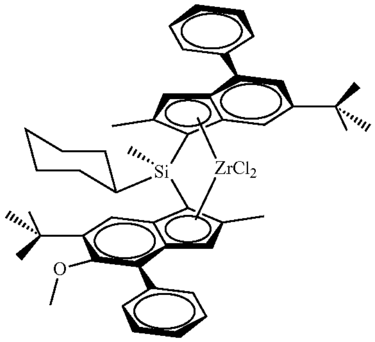
rac-anti-Me(CyHex)Si(2-Me-4-Ph-6-tBu-Ind)(2-Me-4-Ph-5-OMe-6-tBu-Ind)$ZrCl_2$
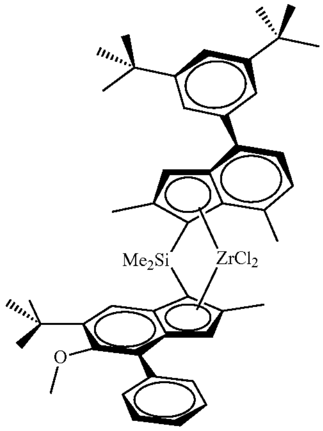
rac-anti-$Me_2Si$(2-Me-4-(3,5-di-tBuPh)-7-Me-Ind)(2-Me-4-Ph-5-OMe-6-tBu-Ind)$ZrCl_2$ -continued
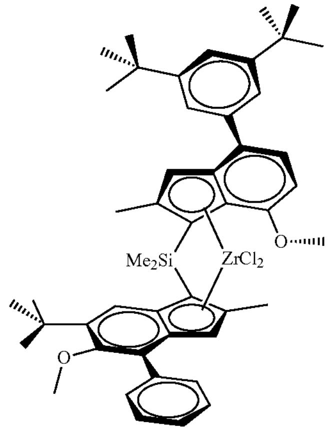
rac-anti-$Me_2Si$(2-Me-4-(3,5-di-tBuPh)-7-OMe-Ind)(2-Me-4-Ph-5-OMe-6-tBu-Ind)$ZrCl_2$
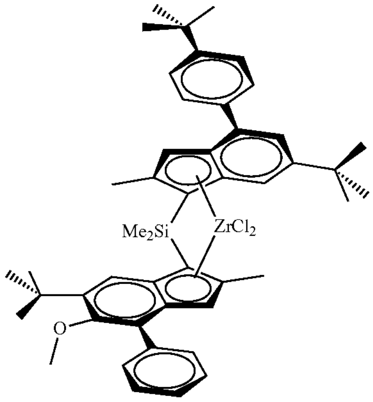
rac-anti-$Me_2Si$(2-Me-4-(p-tBuPh)-6-tBu-Ind)(2-Me-4-Ph-5-OMe-6-tBu-Ind)$ZrCl_2$
-continued
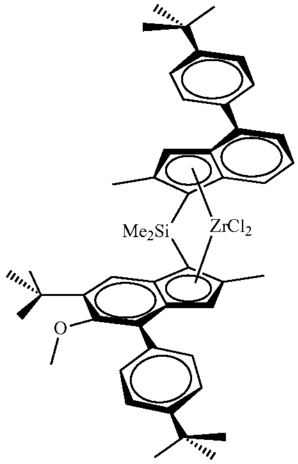
rac-anti-$Me_2Si$(2-Me-4-(p-tBuPh)-Ind)(2-Me-4-(4-tBuPh)-5-OMe-6-tBu-Ind)$ZrCl_2$
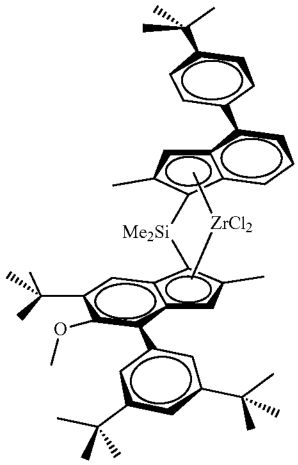
rac-anti-$Me_2Si$(2-Me-4-(p-tBuPh)-Ind)(2-Me-4-(3,5-tBu2Ph)-5-OMe-6-tBu-Ind)$ZrCl_2$ -continued

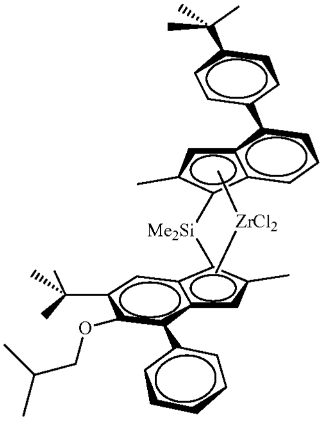

rac-anti-$Me_2Si$(2-Me-4-(p-tBuPh)-Ind)(2-Me-4-Ph-5-OiBu-6-tBu-Ind)$ZrCl_2$

Most preferably rac-anti-$Me_2Si$(2-Me-4-(p-tBuPh)-Ind)(2-Me-4-Ph-5-OMe-6-tBu-Ind)$ZrCl_2$ is used.

The ligands required to form the complexes and hence catalysts of the invention can be synthesized by any process and the skilled organic chemist would be able to devise various synthetic protocols for the manufacture of the necessary ligand materials. For Example WO2007/116034 discloses the necessary chemistry. Synthetic protocols can also generally be found in WO2002/02576, WO2011/135004, WO2012/084961, WO2012/001052, WO2011/076780, WO2013/007650, WO2015/158790 and WO2018/122134. The examples section also provides the skilled person with sufficient direction.

Cocatalyst

To form an active catalytic species it is normally necessary to employ a cocatalyst as is well known in the art. Cocatalysts comprising one or more compounds of Group 13 metals, like organoaluminium compounds or boron containing cocatalysts or combinations therefrom used to activate metallocene catalysts are suitable for use in this invention. In a preferred embodiment of the present invention a cocatalyst system comprising a boron containing cocatalyst, e.g. a borate cocatalyst and an aluminoxane cocatalyst is used.

The single-site polymerization catalyst system used in the invention therefore can comprise (i) a complex as defined above and an aluminoxane cocatalyst.

The aluminoxane cocatalyst can be one of formula (VI):

(VI)

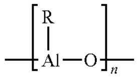

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$-alkyl, preferably $C_1$-$C_5$-alkyl, or $C_3$-$C_{10}$-cycloalkyl, $C_7$-$C_{12}$-arylalkyl or -alkylaryl and/or phenyl or naphthyl, and where Y can be hydrogen, halogen, preferably chlorine or bromine, or $C_1$-$C_{10}$-alkoxy, preferably methoxy or ethoxy. The resulting oxygen-containing aluminoxanes are not in general pure compounds but mixtures of oligomers of the formula (VI).

The preferred aluminoxane is methylaluminoxane (MAO).

Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used. Boron containing cocatalysts of interest include those of formula (VII)

$$BY_3 \quad (VII)$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are fluorine, trifluoromethyl, aromatic fluorinated groups such as p-fluorophenyl, 3,5-difluorophenyl, pentafluorophenyl, 3,4,5-trifluorophenyl and 3,5-di(trifluoromethyl)phenyl. Preferred options are trifluoroborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris (3,5-difluorophenyl)borane and/or tris (3,4,5-trifluorophenyl)borane.

Particular preference is given to tris(pentafluorophenyl) borane.

However it is preferred that as a boron containing cocatalyst borates are used, i.e. compounds containing a borate.

These compounds generally contain an anion of formula:

$$(Z)_4B^- \quad (VIII)$$

where Z is an optionally substituted phenyl derivative, said substituent being a halo-$C_{1-6}$-alkyl or halo group. Preferred options are fluoro or trifluoromethyl. Most preferably, the phenyl group is perfluorinated.

Such ionic cocatalysts preferably contain a weakly-coordinating anion such as tetrakis(pentafluorophenyl)borate or tetrakis(3,5-di(trifluoromethyl)phenyl)borate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include:

tributylammoniumtetra(pentafluorophenyl)borate, tributylammoniumtetra(trifluoromethylphenyl)borate, tributylammoniumtetra(4-fluorophenyl)borate, N,N-dimethylcyclohexylammoniumtetrakis(pentafluorophenyl)borate, N,N-dimethylbenzylammoniumtetrakis(pentafluorophenyl)borate, N,N-dimethylaniliniumtetrakis(pentafluorophenyl)borate, N,N-di(propyl)ammoniumtetrakis(pentafluorophenyl)borate, di(cyclohexyl)ammoniumtetrakist(pentafluorophenyl)borate, triphenylcarbeniumtetrakis(pentafluorophenyl)borate, or ferroceniumtetrakis(pentafluorophenyl)borate.

Preference is given to triphenylcarbeniumtetrakis(pentafluorophenyl) borate,

N,N-dimethylaniliniumtetrakis(pentafluorophenyl)borate,

N,N-dimethylcyclohexylammoniumtetrakis(pentafluorophenyl)borate or

N,N-dimethylbenzylammoniumtetrakis(pentafluorophenyl)borate

According to the present invention, it is especially preferred to use an aluminoxane cocatalyst, like MAO, together with a boron containing cocatalyst, like borate cocatalyst. Suitable amounts of co-catalyst will be well known to the skilled person.

Preferably, the amount of cocatalyst is chosen to reach below defined molar ratios. The molar ratio of feed amounts of boron (B) to the metal ion (M) (preferably zirconium) of the metallocene boron/M may be in the range 0.1:1 to 10:1 mol/mol, preferably 0.3:1 to 7:1, especially 0.3:1 to 5:1 mol/mol.

Even more preferably, the molar ratio of feed amounts of boron (B) to metal ion (M) (preferably zirconium) of the metallocene boron/M is from 0.3:1 to 3:1

The molar ratio of Al from the aluminoxane to the metal ion (M) (preferably zirconium) of the metallocene Al/M may be in the range 1:1 to 2000:1 mol/mol, preferably 10:1 to 1000:1, and more preferably 50:1 to 600:1 mol/mol.

Catalyst System

The catalyst system used to manufacture the $C_2C_3$ random copolymers of the invention is ideally provided in solid particulate form supported on an external carrier.

The particulate support material used is silica or a mixed oxide such as silica-alumina.

The use of a silica support is preferred. The skilled man is aware of the procedures required to support a metallocene catalyst.

Especially preferably the support is a porous material so that the complex may be loaded into the pores of the particulate support, e.g. using a process analogous to those described in WO94/14856, WO95/12622 and WO2006/097497.

The average particle size of the silica support can be typically from 10 to 100 μm. However, it has turned out that special advantages can be obtained if the support has an average particle size from 15 to 80 μm, preferably from 18 to 50 μm.

The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

Additives

The propylene-ethylene random copolymer (RACO) can optionally comprise one or more additives in a total amount of from 0.1 up to 5.0 wt %, based on the copolymer, selected from the group comprising slip agents, anti-block agents, UV stabilizers, antistatic agents, alpha-nucleating agents and antioxidants. The amount of added additives and the amount of the propylene-ethylene random copolymer (RACO) sum up to 100.0 wt %.

The above described propylene-ethylene random copolymer (RACO) is the sole polymer used according to the present invention.

Step B)

The process for the production of a polypropylene based article having improved surface tension retention according to the present invention comprises as a second step B) forming an article out of the metallocene-catalysed propylene-ethylene random copolymer (RACO), as described above, with a thickness in the range of from 1.0 to 1000 μm.

Articles according the present invention can be produced with several known conversion techniques, such as injection moulding or extrusion via blown or cast film technology.

Extruded articles produced via blown or cast film technology, such as blown or cast films, are preferred, extruded articles produced via cast film technology, such as cast films, are especially preferred Films according to the present invention may be non-oriented, mono-axially or bi-axially oriented.

It is preferred, that the films are non-oriented.

Especially preferred are however cast-films, especially preferred are non-oriented cast films.

Films according to the present invention may be mono- or multilayer films, comprising one or more layers, like two, three or five layers, even up to seven, up to 9 or up to 12 layers, wherein mono-layer films are preferred.

Further preferred are multilayer films with 3 or more layers, such as multilayer films with 5-7 layers, in which at least one of the outer layers the metallocene-catalysed propylene-ethylene random copolymer (RACO) according to the present invention is the only polymeric component.

In multilayer films comprising the metallocene-catalysed propylene-ethylene random copolymer (RACO) of the current invention, the metallocene-catalysed propylene-ethylene random copolymer (RACO) of the current invention may be contained by at least one of the layers.

It is envisaged by the invention that the metallocene-catalysed propylene-ethylene random copolymer (RACO) of the current invention may be also comprised by more than one layer, like two or three layers of the multilayer film. It may be also comprised by all layers of the multilayer film.

However, it is preferred, if the metallocene-catalysed propylene-ethylene random copolymer (RACO) of the current invention is comprised by at least one or both outer layers so it can be easily exposed to surface treatment.

It is further preferred, that the metallocene-catalysed propylene-ethylene random copolymer (RACO) of the current invention is comprised by just one outer layer.

It is especially preferred, that any outside layer exposed to surface treatments comprises the metallocene-catalysed propylene-ethylene random copolymer (RACO) of the current invention.

Films according to the present invention may preferably have a film thickness of at least 5 to 500 μm, like 10-200 μm, more preferably of 15 to 150 μm, like 20-120 μm.

Step C)

Following their production one or more surface(s) of the metallocene-catalysed propylene-ethylene random copolymer (RACO) articles are subjected to a surface tension increasing treatment, such as for example chemical treatment, flame-treatment and Corona-treatment. The preferred methods are flame- and Corona-treatment. The most preferred method is Corona-treatment.

Corona treatment increases the surface energy of the film and consequently its surface tension. The system includes a power source and the treatment station. The power source transform 50/60 Hz plant power into much higher frequency power in a range of 10 to 30 kHz. This higher frequency energy is supplied to the treatment station and is applied to the film surface by means of two electrodes, one with high potential and the other with low potential, through an air gap that typically ranges from 0.5 inches to 1 inch. The surface tension on the film surface is increased when the high potential difference that is generated ionizes the air.

Corona treatment can be done inline or as a separate downstream process once the film is produced. If performed inline, special consideration must be given to the potential generation of toxic ozone. In some cases, it is necessary to provide a ventilation system in the production area.

For flame treatment with a polarized flame an electrical voltage is applied between a burner, serving as the negative pole, and another element, for example a chill roll in film or sheet extrusion. The applied voltage is in the range from about 0.5 kV to about 3 kV. It causes an acceleration of ionized atoms, which hit the polypropylene surface at great speed and then break bonds on the surface of the metallocene-catalysed propylene-ethylene random copolymer (RACO) articles. In consequence, polar centers are created.

The metallocene-catalysed propylene-ethylene random copolymer (RACO) used according to the present invention has been found to be more responsive to surface energy increasing treatments than comparable Ziegler-Natta catalysed propylene-ethylene random copolymers (RACO).

Very surprisingly, the metallocene-catalysed propylene-ethylene random copolymer (RACO) used according to the present invention has also been found to have a slower decay of the effects of the surface-modifying treatment. Compared to surface energy enhanced articles made from comparable Ziegler-Natta catalysed propylene-ethylene random copolymers, the metallocene-catalysed propylene-ethylene random copolymer (RACO) articles can be stored for a longer period of time before further transformation, e.g. printing, without having to undergo a "refresher" treatment.

Limit values of the dyne-levels to be achieved directly after surface treatment, preferably Corona treatment with 2500 W, are preferably at least 45 dyne/cm (measured according to ASTM D2578-09) or higher, like 48 to 60 dyne/cm.

It is a clear target for films in the packaging industry, to provide films with dyne levels of >35 dyne/cm over at least 7 days or more to enable printing without any additional surface treatment.

Further preferred are films having dyne levels after 7 days of at least 38 dyne/cm or more, like 40 dyne/cm or more.

Dyne Retention Ratio DRRx

The Dyne retention ratio indicates the dyne retention after x days, wherein x represents the days of storage, in relation to the originally dyne retention value determined 6 hours after corona treatment multiplied by 100.

Expressed Alternatively

"DRRx [%]=" "Dyne retention on day x"/"Dyne retention on day 0" "*100" Equation 1: Dyne Retention Ratio The dyne retention ratio after 7 days (DRR7) is preferably 76.0% or more, such as 78.0% or 80.0%.

The articles, preferably films, received after surface treatment furthermore have a haze value measured on a 50 μm cast film determined according to ASTM D1003-00 in a range of from to 1.0%, preferably from 0.10 to 0.8, more preferably from 0.15 to 0.5%

The tensile modulus in machine and transverse direction of the articles, preferably films, determined according to ISO 527-3 at 23° C. on cast films of 50 μm thickness is preferably in the range of from 300 to 1000 MPa, preferably from 400 to 800 MPa and more preferably from 450 to 700 MPa, like 500 to 650 MPa.

EXAMPLES

Measuring Methods

The following definitions of terms and determination methods apply for the above general description of the invention as well as to the below examples unless otherwise defined.

$MFR_2$ (230° C.) is measured according to ISO 1133 (230° C., 2.16 kg load).

Calculation of Melt Flow Rate $MFR_2$ (230° C.) of the Polymer Fraction (RACO-2)

$$MFR(A2) = 10^{\left[\frac{\log(MFR(A)) - w(A1)\times\log(MFR(A1))}{w(A2)}\right]} \quad \text{(II)}$$

wherein w(A1) is the weight fraction [in wt %] of the polymer fraction RACO-1 w(A2) is the weight fraction [in wt %] of the polymer fraction RACO-2,

MFR(A1) is the melt flow rate $MFR_2$ (230° C.) [g/10 min] of the polymer fraction RACO-1, MFR(A) is the melt flow rate $MFR_2$ (230° C.) [g/10 min] of the $C_2C_3$ random copolymer (RACO), MFR(A2) is the calculated melt flow rate $MFR_2$ (230° C.) [g/10 min] of the polymer fraction RACO-2.

Quantification of Microstructure by NMR Spectroscopy

Quantitative nuclear-magnetic resonance (NMR) spectroscopy was used to quantify the comonomer content and regio-defect content of the polymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in approximately 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at ppm using the chemical shift of the solvent. This approach allowed comparable referencing even when this structural unit was not present. Characteristic signals corresponding to the incorporation of ethylene were observed (W-J. Wang and S. Zhu, Macromolecules 33 (2000) 1157; Cheng, H. N., Macromolecules 17 (1984), 1950; Randall, J. Macromol. Sci., Rev. Macromol. Chem. Phys. 1989, C29, 201).

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content. Through the use of this set of sites the corresponding integral equation becomes $$p_S=I_A+(0.5*I_B)$$

$$p_T=I_D+I_F+I_D$$

$$p=(p_S+p_T)/2$$

$$e=0.5*(I_H+(0.5*I_B))$$

$$fE=e/(e+p)$$

using the same notation used in the article of Wang et. al.

The mole percent comonomer incorporation was calculated from the mole fraction:

$$E[\text{mol }\%]=100*fE$$

The weight percent comonomer incorporation was calculated from the mole fraction:

$$E[\text{wt }\%]=100*(fE*28.06)/((fE*28.06)+((1-fE)*42.08))$$

Characteristic signals corresponding to regio defects were observed (Resconi, L., Cavallo, L., Fait, A., Piemontesi, F., Chem. Rev. 2000, 100, 1253; W-J. Wang and S. Zhu, Macromolecules 33 (2000) 1157). The presence of isolated 2,1-erythro region-defects was indicated by the presence of the two methyl sites at 17.7 and 17.2 ppm and confirmed by other characteristic sites. The presence of 2,1 regio-defect adjacent an ethylene unit was indicated by the two inequivalent Sαβ signals at 34.9 ppm and 34.7 ppm respectively and the Tγγ at 34.1 ppm.

The amount of isolated 2,1-erythro region-defects ($P_{21e\ isolated}$) was quantified using the average integral of the two characteristic methyl sites at 17.7 ($I_{e8}$) and 17.4 ($I_{e6}$) ppm respectively:

$$P_{21e\ isolated}=(I_{e6}+I_{e8})/2$$

The amount of 2,1 regio-defect adjacent to ethylene ($P_{E21}$) was quantified using the methine site at 34.1 ppm ($I_{T\gamma\gamma}$):

$$P_{E21}=I_{T\gamma\gamma}$$

The total amount of propene ($P_{total}$) was quantified based on the methyl region ($I_{CH3}$) between 23.0 and 19.9 ppm with correction undertaken for sites included in this region not related to propene insertion. The methyl group $P_{\gamma\gamma}$ resulting from 2,1 regio-defect adjacent to ethylene is already present in $I_{CH3}$:

$$P_{total}=I_{CH3}+2*P_{21e\ isolated}$$

The isolated 2,1-erythro regio defects ($P_{21e\ isolated}$) is multiplied by 2 to take into account the two (2) propene units in the 2, 1-erythro regio defects.

The mole percent of isolated 2,1-erythro regio defects was quantified with respect to all propene:

$$[21e]\text{ mol }\%=100*P_{21e\ isolated}/P_{total}$$

The mole percent of 2,1 regio defects adjacent to ethylene was quantified with respect to all propene:

$$[E21]\text{ mol }\%=100*P_{E21}/P_{total}$$

The total amount of 2,1 defects was quantified as following:

$$[21]\text{ mol }\%=[21e]+[E21]$$

Characteristic signals corresponding to other types of regio defects (2,1-threo, 3,1 insertion) were not observed (Resconi, L., Cavallo, L., Fait, A., Piemontesi, F., Chem. Rev. 2000, 100, 1253).

Calculation of Comonomer Content of the Second Polymer Fraction (RACO-2):

$$\frac{C(A)-w(A1)\times C(A1)}{w(A2)}=C(A2) \quad (I)$$

wherein w(A-1) is the weight fraction [in wt %] of the first polymer fraction (RACO-1), w(A-2) is the weight fraction [in wt %] of second polymer fraction (RACO-2), C(A-1) is the comonomer content [in wt %] of the first polymer fraction (RACO-1), C(A) is the comonomer content [in wt %] of the 0 2 0 3 random copolymer (RACO), C(A-2) is the calculated comonomer content [wt %] of the second polymer fraction (RACO-2).

The Xylene Solubles (XCS, wt %):

Content of xylene cold solubles (XCS) is determined at 25° C. according ISO 16152; 2005

DSC Analysis, Melting Temperature ($T_m$) and Crystallization Temperature ($T_c$):

measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C.

Crystallization temperature ($T_c$) and crystallization enthalpy ($H_c$) are determined from the cooling step, while melting temperature ($T_m$) and melting enthalpy ($H_m$) are determined from the second heating step.

Flexural modulus is determined according to ISO 178 on 80×10×4 $mm^3$ test bars injection moulded in line with EN ISO 1873-2.

Density

The density was measured according to ISO 1183D and IS01872-2 for sample preparation.

Haze was determined according to ASTM D1003-00 on cast films with a thickness of 50 μm produced as indicated below.

Tensile Modulus

Tensile modulus in machine and transverse direction were determined according to ISO 527-3 at 23° C. on cast films of 50 μm thickness produced as indicated below. Testing was performed at a cross head speed of 1 mm/min.

Surface Energy and Dyne Retention

Surface energy is determined via wetting tension according to ASTM D2578-09 using test-inks (mixtures of formamide and ethyl cellosolve) with a surface tension in between 34 and 56 dynes/cm, namely "AFS corona treatment tester", supplied by AFS, Augsburg, Germany. It is important, that the tested surface area is not roughened before wetting but as smooth as possible.

The inks are applied with cotton buds over a surface of 6.5 $cm^2$, starting with a low surface tension-ink until an ink is used, which does not wet the surface anymore The surface tension is then determined visually by estimating how the liquid reacts within the first two seconds following application of the ink onto the surface. The test liquid can shrink and/or form itself into globules (individual droplets) or it can remain unchanged forming an ink-film on the test-film.

When a test liquid shrinks or forms into droplets it indicates that the film has a lower surface energy than the liquid applied.

The test should be repeated as many times as necessary with test-inks having surface tension values of +/−2 dynes/cm different from the first measured dyne-value, until the marking remains stable for a period of two seconds or more. Once that has been achieved, the film can be said to have that level or surface energy at least equal to that of the liquid applied. Further applications should be made until shrinkage or droplets occur within two seconds. This last measurement should be taken as failure, and the surface energy of the liquid used for the previous measurement should be taken to be the surface energy of the film.

The surface tension for the inventive and comparative examples was tested daily in the first week.

Dyne Retention Ratio DRRx

Dyne retention ratio DRRx indicates the dyne retention after x days, wherein x represents the days of storage, in relation to the originally dyne retention value determined 6 hours after corona treatment multiplied by 100.

Expressed Alternatively

"DRRx [%]=" "Dyne retention on day x"/"Dyne retention on day 0" "*100" Equation 1: Dyne retention ratio

Examples

The catalyst used in the polymerization processes for the $C_2C_3$ random copolymer of the inventive example (IE1 and IE2) was prepared as follows:

The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride)

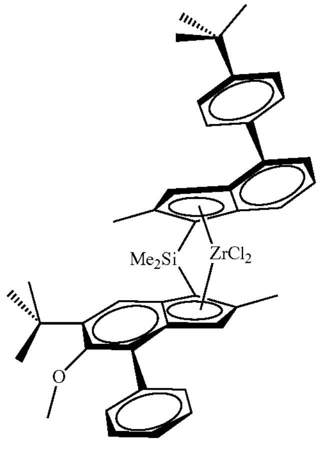

has been synthesized according to the procedure as described in WO WO2013007650, E2. The catalyst system was prepared using metallocene MC1 and a catalyst system of MAO and trityl tetrakis(pentafluorophenyl)borate. The catalyst was supported onto silica.

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (7.4 kg) was added from a feeding drum followed by careful pressuring and depressurising with nitrogen using manual valves. Then toluene (32 kg) was added. The mixture was stirred for 15 min. Next 30 wt % solution of MAO in toluene (17.5 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The MAO treated support was washed twice with toluene (32 kg) at 90° C., following by settling and filtration. The reactor was cooled off to 60° C. and the solid was washed with heptane (32.2 kg). Finally MAO treated SiO2 was dried at 60° under nitrogen flow for 2 hours and then for 5 hours under vacuum (−0.5 barg) with stirring. MAO treated support was collected as a free-flowing white powder found to contain 12.6% Al by weight.

Catalyst System Preparation For Inventive Examples 1E1 and 1E2

30 wt % MAO in toluene (2.2 kg) was added into a steel nitrogen blanked reactor via a burette at 20° C. Toluene (7 kg) was then added under stirring. Metallocene MC1 (286 g) was added from a metal cylinder followed by flushing with 1 kg toluene. The mixture was stirred for 60 minutes at 20° C. Trityl tetrakis(pentafluorophenyl) borate (336 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under N2 flow at 60° C. for 2 h and additionally for 5 h under vacuum (−0.5 barg) under stirring. Dried catalyst was sampled in the form of pink free flowing powder containing 13.9 wt % Al and 0.26 wt % Zr.

The polymerization for preparing the inventive $C_2C_3$ random copolymers (RACO) was performed in a Borstar pilot plant with a 2-reactor set-up (loop—gas phase reactor ($GPR^1$)) In Table 1 the polymerization conditions for 1E1 and 1E2 are given.

TABLE 1

| Polymerization data (inventive) | | |
|---|---|---|
| | IE1 | IE2 |
| Prepoly reactor | | |
| Temperature [° C.] | 20 | 25 |
| Pressure [Pa] | 5264 | 5208 |
| Residence time [h] | 0.5 | 0.4 |
| loop reactor | | |
| Temperature [° C.] | 70 | 70 |
| Pressure [Pa] | 5258 | 5262 |
| Feed H2/C3 ratio [mol/kmol] | 0.3 | 0.3 |
| Feed C2/C3 ratio [mol/kmol] | 25.4 | 33.9 |
| Polymer Split [wt %] | 57 | 61 |
| MFR2 [g/10 min] (MFR of RACO-1) | 8.0 | 8.0 |
| C2 loop [wt %] (C2 of RACO-1) | 2.0 | 3.0 |
| Residence time | 0.45 | 0.45 |
| GPR1 | | |
| Temperature [° C.] | 80 | 80 |
| Pressure [Pa] | 2600 | 2400 |
| H2/C3 ratio [mol/kmol] | 3.3 | 3.9 |
| C2/C3 ratio [mol/kmol] | 118 | 152 |
| Polymer residence time (h) | 2.3 | 2.3 |
| Polymer Split [wt %] | 43 | 39 |
| MFR2 [g/10 min] in GPR1 (MFR of RACO-2) | 8.0 | 8.o |
| C2 in GPR1 [wt %] (C2 of RACO-2) | 2.8 | 2.7 |

The polymer powders were compounded in a co-rotating twin-screw extruder Coperion ZSK 57 at 220° C. with 0.2 wt % antiblock agent (synthetic silica; CAS-no. 7631-86-9); 0.1 wt % antioxidant (Irgafos 168 μF); 0.1 wt % of a sterically hindered phenol (Irganox 1010 μF); 0.02 wt % of Ca-stearat) and 0.02 wt % of a non-lubricating acid scavenger (Synthetic hydrotalcite; CAS-no. 11097-59-9).

TABLE 2

| Basic polymer properties (inventive) | | |
|---|---|---|
| Pellet | IE1 | IE2 |
| XCS [wt %] | 1.3 | 2.1 |
| Total C2 [wt %] | 2.5 | 2.9 |
| 2,1 regio-defects [mol %] | 0.6 | 0.7 |
| MFR2 [g/10 min] | 7.0 | 8.0 |
| Tm [° C.] | 139 | 133 |
| Tc [° C.] | 111 | 99 |
| Flexural modulus [MPa] | 990 | 820 |

The polymer used for the Comparative Example CE1 was RD808CF, a propylene-ethylene random copolymer, commercially available from Borealis.

RD808CF is a visbroken copolymer, the base polymer for which has been produced with a non-phthalate Ziegler Natta catalyst as described for example in WO 2014187686 A1. $MFR_2$ (230° C.) is 8.0 g/10 min, C2 content 4.5 wt.-%, XCS content 8.5 wt.-%, Tm 140° C., Tc 102° C., Flexural Modulus 700 MPa. The content of 2,1 regio-defects in the polymer chain is below the detection limit for $^{13}C$ NMR spectroscopy.

The inventive propylene-ethylene random copolymers (RACOs) and the polymer of CE1 were converted to monolayer cast films with a thickness of 50 μm on an SML 3-layer co-extrusion cast film line supplied by Starlinger Maschinenbau Lenzing (Austria) equipped with four extruders, three of which were used with identical polymer for achieving a monolayer film.The used extruders are one Barmag 60 mm type with a maximum capacity of 120 kg/h, one Reifenhauser 45 mm type with a maximum capacity of 50 kg/h and one Reifenhauser 60 mm type with a maximum capacity of 140 kg/h. The feed block for the coat-hanger die of 800 mm width and 0.5 mm gap with was set at equal thickness, all extruders equipped with PP-type screws were operated at 220-240° C. The air knife was set at low power, ant the film was extruded at 50 m/min onto a casting roll with 540 mm diameter and a surface roughness of 0.1μ followed by a take-off roll with 300 mm diameter, both rolls set at 20° C.

The surface treatment of the films was done using a Corona Generator G2OS supplied by AFS GmbH (Germany), the energy loading was 2500 W for all samples, frequency used was in the range of 26 kHz to 28 kHz. Care was taken that the distance of the charging bar to the film was equal over the whole width of the film. Film speed at corona treatment was 50 m/min.

TABLE 3

| Dyne retention [dyne/cm] | | | | |
|---|---|---|---|---|
| | Days | | | |
| Example | 0 | 1 | 3 | 7 |
| IE1 | 50 | 44 | 42 | 40 |
| IE2 | 50 | 44 | 42 | 40 |
| CE1 | 48 | 42 | 40 | 36 |

TABLE 4

| Dyne retention ratio after 7 days (DRR7 [%]) | | |
|---|---|---|
| | Days | |
| Example | 0 | 7 |
| IE1 | 100 | 80 |
| IE2 | 100 | 80 |
| CE1 | 100 | 75 |

TABLE 5

| Film properties (50 μm) | | | | |
|---|---|---|---|---|
| | | IE1 | IE2 | CE1 |
| Tensile mod. MD | MPa | 590 | 517 | 448 |
| Tensile mod. TD | MPa | 581 | 522 | 462 |
| Haze | % | 0.31 | 0.22 | 0.21 |

As can be seen, IEs have a higher surface tension direct after surface treatment and also the retention of surface tension is better than for RD808CF.

Furthermore, the films of the Inventive Examples have higher Tensile Modulus and a comparably low haze value.

The invention claimed is:

1. A process for the production of a polypropylene based article having improved surface tension retention, the process comprises:

A) providing a metallocene-catalysed propylene-ethylene random copolymer (RACO) having (a) an ethylene content in a range of from 1.0 to 10.0 wt % based on a total weight of the metallocene-catalysed propylene-ethylene random copolymer (RACO);

(b) a melt flow rate $MFR_2$ (230° C./2.16 kg) measured according to ISO 1133 in a range of from 1.0 to 20.0 g/10 min;

(c) a melting temperature Tm as determined by DSC according to ISO 11357 of from 115 to 150° C.;

(d) a xylene cold soluble (XCS; ISO 16152, 2005; 25° C.) fraction of from 0.1 wt % to 5.0 wt % and (e) a content of 2,1 regio-defects in a range from 0.05 to 1.5 mol % as determined by 13C-NMR spectroscopy B) forming a polypropylene based article out of the metallocene-catalysed propylene-ethylene random copolymer (RACO) with a thickness in a range of from 1.0 to 1000 μm and C) subjecting one or more surface(s) of the polypropylene based article to a treatment that increases the surface tension, to yield a polypropylene based article having improved surface tension retention, wherein the polypropylene based article having improved surface tension retention has a dyne retention ratio ($DRR_7$) of at least 76% or more, wherein dyne retention ratio ($DRR_7$) indicates the dyne retention of the polypropylene based article having improved surface tension retention after 7 days of storage, in relation to an original dyne retention value of the polypropylene based article having improved surface tension retention, determined 6 hours after the treatment that increases the surface tension, multiplied by 100, and wherein the metallocene-catalysed propylene-ethylene random copolymer (RACO) is the sole polymer used for forming the polypropylene based article.

2. The process according to claim 1, wherein the metallocene-catalysed propylene-ethylene random copolymer (RACO) furthermore has a crystallization temperature Tc as determined by DSC according to ISO 11357 in a range of 85° C. to 120° C., and/or a flexural modulus (determined according to ISO 178 on injection molded specimens) of 600 to 1400 MPa.

3. The process according to claim 2, wherein the metallocene-catalysed propylene-ethylene random copolymer (RACO) has a crystallization temperature Tc as determined by DSC according to ISO 11357 in a range of 90° C. to 115° C. and/or a flexural modulus (determined according to ISO 178 on injection moulded specimens) in a range of 700 to 1400 MPa.

4. The process according to claim 1, wherein the metallocene-catalysed propylene-ethylene random copolymer (RACO) is unimodal or multimodal in view of the comonomer content and/or $MFR_2$ and comprises polymer fractions (RACO-1) and (RACO-2).

5. The process according to claim 4, wherein the metallocene-catalysed propylene-ethylene random copolymer (RACO) is unimodal or multimodal in view of the comonomer content and/or $MFR_2$ and consists of polymer fractions (RACO-1) and (RACO-2).

6. The process according to claim 4, wherein the metallocene-catalysed propylene-ethylene random copolymer (RACO) comprises 30.0 to 70.0 wt % of polymer fraction (RACO-1) having (i) an ethylene content in a range of from 1.5 to 5.5 wt % and (ii) a melt flow rate $MFR_2$ (230° C./2.16 kg) measured according to ISO 1133 in a range of from 2.0 to 15.0 g/10 min and 70.0 to 30.0 wt % of polymer fraction (RACO-2) having (i) an ethylene content in a range of from 2.2 to 8.0 wt % and (ii) a melt flow rate $MFR_2$ (230° C./2.16 kg) measured according to ISO 1133 in a range of from 4.0 to 12.0 g/10 min.

7. The process according to claim 1, wherein the treatment that increases the surface tension is a corona-treatment or a flame-treatment.

8. The process according to claim 1, wherein the treatment that increases the surface tension is a corona-treatment.

9. The process according to claim 1, wherein the metallocene-catalysed propylene-ethylene random copolymer (RACO) is produced by a process comprising:

a) polymerizing in a first reactor (R1) propylene and ethylene, obtaining polymer fraction (RACO-1) of the propylene-ethylene random copolymer (RACO), b) transferring the polymer fraction (RACO-1) and unreacted comonomers of the first reactor into a second reactor (R2), c) feeding to the second reactor (R2) propylene and ethylene, d) polymerizing in the second reactor (R2) and in the presence of the polymer fraction (RACO-1) propylene and ethylene and obtaining polymer fraction (RACO-2), the polymer fraction (RACO-1) and the polymer fraction (RACO-2) forming the propylene-ethylene random copolymer (RACO), wherein the polymerization takes place in the presence of a metallocene catalyst comprising (a) a complex of formula (I):

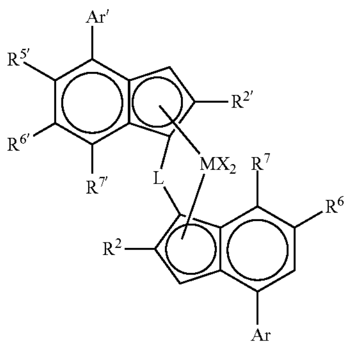

wherein

M is zirconium or hafnium;

each X is a sigma ligand;

L is a divalent bridge selected from $—R'_2C—$, $—R'_2C—CR'_2—$, $—R'_2Si—$, $—R'_2Si—SiR'_2—$, $—R'_2Ge—$, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$ hydrocarbyl radical optionally containing one or more heteroatoms from groups 14-16;

$R^{5'}$ is a $C_{1-20}$ hydrocarbyl group containing one or more heteroatoms from groups 14-16 optionally substituted by one or more halo atoms;

$R^6$ and $R^6$ are each independently hydrogen or a $C_{1-20}$ hydrocarbyl group optionally containing one or more heteroatoms from groups 14-16;

$R^7$ is hydrogen or $C_{1-20}$ hydrocarbyl group optionally containing one or more heteroatoms from groups 14-16;

$R^{7'}$ is hydrogen;

Ar and Ar' are each independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar or Ar' group, said ring being itself optionally substituted with one or more groups R4;

each $R^4$ is a $C_{1-20}$ hydrocarbyl group; and (ii) a cocatalyst comprising at least one or two compounds of a group 13 metal.

10. The process according to claim 1, wherein the polypropylene based article formed in step B) is a cast film or a blown film, wherein the cast film or blown film is a non-oriented film, a machine direction oriented (MDO) film or a biaxially oriented film.

11. The process according to claim 10, wherein the cast film or blown film has a film thickness of 5 to 500 μm.

12. The process according to claim 11, wherein the cast film or blown film has a film thickness of 15 to 150 μm.

13. The process according to claim 10, wherein the polypropylene based article is a non-oriented cast film or blown film.

14. The process according to claim 13, wherein the polypropylene article is a non-oriented cast film.

15. A polypropylene based article obtained by the process according to claim 1, wherein the one or more surface(s) subjected to a surface energy increasing treatment has/have a dyne level of at least 45 dyne/cm, measured according to ASTM D2578-09 directly after the treatment.

16. The polypropylene based article according to claim 15, wherein the one or more surface(s) subjected to a surface energy increasing treatment maintains a dyne level of at least 38 dyne/cm measured according to ASTM D2578-09 for a period of 7 days after the treatment.

17. The polypropylene based article according to claim 15, wherein the dyne retention ratio ($DRR_7$) is at least 78.0% or more.

18. The polypropylene based article according to claim 15, wherein the polypropylene based article has a haze value measured on a 50 μm cast film determined according to ASTM D1003-00 in a range of from 0.05 to 1.0%.

19. The polypropylene based article according to claim 15, wherein the polypropylene based article has a tensile modulus in machine and transverse direction, determined according to ISO 527-3 at 23° C. on cast films of 50 μm thickness in a range of from 300 to 1000 MPa.

20. The polypropylene based article according to claim 15, wherein the one or more surface(s) subjected to a surface energy increasing treatment has/have a dyne level of 48 to 60 dyne/cm measured according to ASTM D2578-09 directly after the treatment.

* * * * *